United States Patent von der Eltz et al.

[11] Patent Number: 5,541,302
[45] Date of Patent: Jul. 30, 1996

[54] WATER-SOLUBLE DISAZO COMPOUNDS CONTAINING AN ORTHO-CARBOXY PHENYLAMINO-FLUORO-S-TRIAZINYL RADICAL, SUITABLE AS DYESTUFFS

[75] Inventors: Andreas von der Eltz, Frankfurt am Main; Werner H. Russ, Flörsheim am Main, both of Germany

[73] Assignee: Hoechst Aktiengesellschaft, Germany

[21] Appl. No.: 454,634

[22] Filed: May 31, 1995

Related U.S. Application Data

[63] Continuation of Ser. No. 156,300, Nov. 23, 1993, abandoned.

[30] Foreign Application Priority Data

Nov. 25, 1992 [DE] Germany ............ 42 39 519.4

[51] Int. Cl.$^6$ .................. C09B 62/09; D06P 1/382
[52] U.S. Cl. .......................... 534/637; 534/598
[58] Field of Search .............................. 534/637

[56] References Cited

U.S. PATENT DOCUMENTS

| | | | |
|---|---|---|---|
| 4,329,282 | 5/1982 | Henk | 534/637 |
| 4,798,887 | 1/1989 | Krueger et al. | 534/637 |
| 4,906,739 | 3/1990 | Seiler et al. | 534/637 X |
| 5,075,428 | 12/1991 | Jäger | 534/637 |

FOREIGN PATENT DOCUMENTS

| | | | |
|---|---|---|---|
| 0083052 | 7/1983 | European Pat. Off. | |
| 134197 | 3/1985 | European Pat. Off. | 534/637 |
| 0356681 | 3/1990 | European Pat. Off. | |
| 2335570 | 7/1977 | France | |
| 2398095 | 2/1979 | France | |
| 61-200174 | 9/1986 | Japan | |
| 471870 | 4/1969 | Switzerland | |
| 952062 | 3/0964 | United Kingdom | 534/637 |
| 1102204 | 2/1968 | United Kingdom | 534/637 |

OTHER PUBLICATIONS

Patent Abstracts of Japan, vol. 11, No. 30, Jan. 29, 1987.

*Primary Examiner*—Fiona T. Powers
*Attorney, Agent, or Firm*—Connolly & Hutz

[57] ABSTRACT

Water-soluble disazo compounds, preparation thereof and use thereof as dyes There are described disazo compounds of the formula (1)

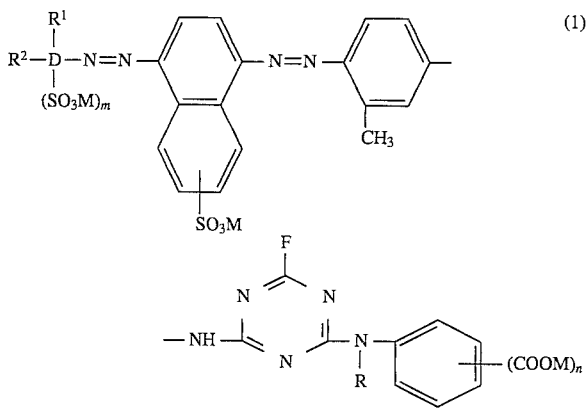

where D is phenyl or naphthyl, $R^1$ is hydrogen, lower alkyl, lower alkoxy, carboxyl, halogen, lower alkanoylamino or benzoylamino, $R^2$ is hydrogen or lower alkyl, M is hydrogen or a salt-forming metal, m is 1, 2 or 3, n is 1 or 2, and R is hydrogen or lower alkyl. The compounds (1) have fiber-reactive properties and are used as dyes for dyeing and printing amino- and/or hydroxy-containing material, in particular fiber material, such as wool, silk and synthetic polyamide and also cellulose fiber materials, such as cotton; the dyeings and prints obtained are strong, fast and reddish brown.

4 Claims, No Drawings

WATER-SOLUBLE DISAZO COMPOUNDS CONTAINING AN ORTHO-CARBOXY PHENYLAMINO-FLUORO-S-TRIAZINYL RADICAL, SUITABLE AS DYESTUFFS

This is a continuation of our application Ser. No. 08/156,300, filed Nov. 23, 1993, now abandoned.

The invention relates to the field of fiber-reactive dyes.

U.S. Pat. Nos. 4,329,282 and 4,798,887 and British Patent 1 102 204 disclose phenylazonaphthylazophenylamino and phenylazonaphthylazonaphthylamino compounds to whose amino group is attached a fiber-reactive halotriazinyl radical and which when used as dyes produce dyeings having a brown shade. More particularly, Table Example 47 of the abovementioned U.S. Pat. No. 4,329,282 discloses a disazo compound which contains the 4-carboxyphenylamino radical as a substituent attached to the fluorotriazine radical; however, this disazo compound has remarkably poor dyeing properties.

The present invention, then, provides for new disazo compounds of the below-indicated and -defined formula (1), which have very good dye properties with improved application properties and on hydroxy and/or carboxamido-containing fiber materials produce dyeings having good fastness properties and very good washoff properties in respect of unfixed dye portions.

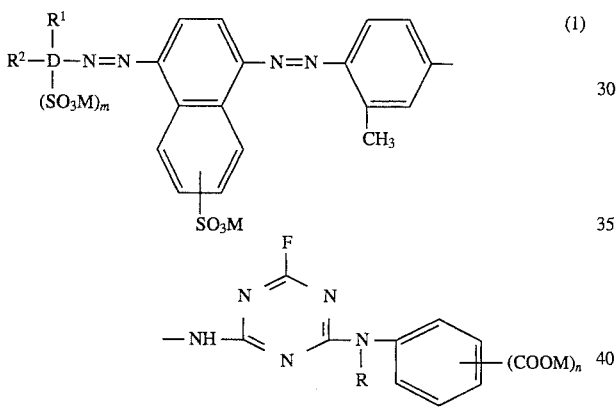

In the formula (1)

D is a phenyl or naphthyl radical, the naphthyl radical preferably being 2-naphthyl, $R^1$ is hydrogen, alkyl of 1 to 4 carbon atoms, such as ethyl and in particular methyl, alkoxy of 1 to 4 carbon atoms, such as ethoxy and in particular methoxy, carboxy, halogen, such as chlorine, bromine and fluorine, alkanoylamino of 2 to 5 carbon atoms, such as acetylamino and propionylamino, or benzoylamino, preferably hydrogen, $R^2$ is hydrogen, or alkyl of 1 to 4 carbon atoms, such as ethyl and in particular methyl, preferably hydrogen, M is hydrogen or an alkali metal, such as sodium, potassium and lithium, or another salt-forming metal, m is 1, 2 or 3, preferably 2 or 3, n is 1 or 2, preferably 1, and when n is 1 the group —COOM is bonded to the benzene ring meta or preferably ortho to the group —(NR)—, R is hydrogen or alkyl of 1 to 4 carbon atoms, such as methyl and ethyl, preferably hydrogen, the group $SO_3M$ on the naphthalene middle component is attached to this 1,4-naphthylene radical in position 6, 7 or 8, preferably in position 6 or 7.

The preferred compounds of the formula (1) are those in which D is 2-naphthyl, $R^1$ and $R^2$ are each hydrogen, and m is 2 or 3 and also those in which n is 1 and the group —COOM is bonded to the benzene radical ortho to the group —N(R)—. When D is phenyl, $R^1$ and $R^2$ have the above-mentioned meanings and m is preferably 1 and particularly preferably 2, while $R^1$ is preferably hydrogen, methyl, methoxy, carboxy, chlorine, bromine, acetylamino or benzoylamino and $R^2$ is preferably hydrogen or methyl and $R^1$ and $R^2$ are each particularly preferably hydrogen.

The terms sulfo and carboxy cover not only the acid form but also the salt form. Accordingly, sulfo groups are groups conforming to the formula —$SO_3M$ and carboxy groups are groups conforming to the formula —COOM, where M is as defined above.

The present invention further relates to processes for preparing the disazo compounds of the invention. They comprise reacting an aminodisazo compound of the formula (2)

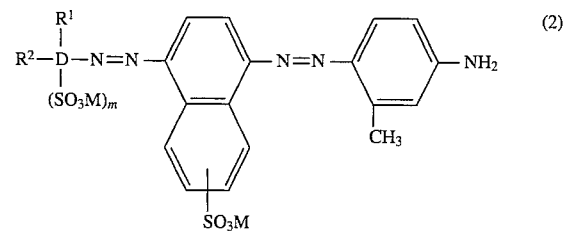

where D, $R^1$, $R^2$, M and m are each as defined above, with cyanuric fluoride (2,4,6-trifluoro-1,3,5-triazine) and reacting the resulting difluorotriazinylaminodisazo compound of the formula (3)

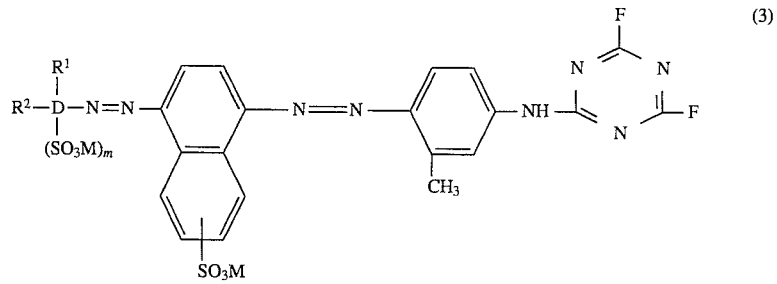

where D, $R^1$, $R^2$, M and m are each as defined above, with a compound of the formula (4)

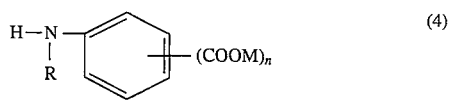

where R, M and n are each as defined above, or reacting a compound of the formula (2) with a compound of the formula (5)

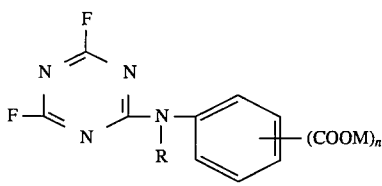

(5)

where R, M and n are each as defined above.

The process variant of the invention whereby a compound of the formula (2) is reacted with cyanuric fluoride and then with a compound of the formula (4) can be carried out in an aqueous or in an aqueous-organic medium; it is preferably carried out in aqueous solution or suspension. If an aqueous-organic reaction medium is used, the organic solvent portion is a solvent which is inert toward the reactants, for example acetone, dimethylformamide, dioxane or dimethyl sulfoxide. The reaction of the aminodisazo compound of the formula (2) with cyanuric fluoride is in general carried out at a temperature between −10° C. and +30° C., preferably between +5° C. and +15° C., and at a pH between 6 and 8, preferably between 4 and 6.

The subsequent reaction of the difluorotriazinylaminodisazo compound of the formula (3) with the compound of formula (4) is in general preferably carried out without isolation from the batch of the previously prepared compound (3) at a temperature between 5° and 20° C., preferably between 5 and 10° C. and at a pH of between 5 and 8, in particular between 6 and 7.5.

The reaction of the invention whereby a compound of the formula (2) is reacted with a compound of formula (5) can likewise be carried out in an aqueous-organic medium; it is preferably carried out in an aqueous medium. In general, it takes place at a temperature between −5° C. and 20° C, in particular between 0° to 10° C., and at a pH between 6 and 9, in particular 6.5 and 7.5.

The starting compounds of formula (2) are prepared in a conventional manner by diazotization and coupling of their corresponding starting components, for instance by coupling 6-, 7- or 8-sulfo-1-aminonaphthalene with the diazo compound of the aromatic amine of the formula (6)

(6)

where $R^1$ $R^2$, D, M and m are each as defined above, and subsequent diazotization of the resulting aminomonoazo compound and coupling with 3-methylaniline. The starting compounds of the formula (5) can be prepared by reacting cyanuric fluoride with a compound of the formula (4) in an aqueous-organic medium (in which the organic solvent portion is as specified above) or in an aqueous medium at a temperature between 0 and 10° C. and at a pH of between 0 and 1 with the addition of an equimolar amount of sodium fluoride or at a pH between 5 and 7.5 in a flow system where no back mixing takes place.

Starting compounds of the formula (6) include 2-sulfo-4-methoxyaniline, 2-sulfo-4-ethoxyaniline, 2,5-disulfo-4-methoxyaniline, 2,5-disulfo-4-ethoxyaniline, 2,5-disulfoaniline, 2,6-dimethyl-3,5-disulfoaniline, 4,8-disulfo-2-aminonaphthalene, 1,5-disulfo-2-aminonaphthalene, 6,8-disulfo-2-aminonaphthalene, 3,6,8-tri-sulfo-2-aminonaphthalene and 4,6,8-trisulfo-2-aminonaphthalene.

The disazo compounds of the formula (1) prepared according to the invention can be separated and isolated from the synthesis solutions by generally known methods, for instance either by precipitation of the reaction medium by means of electrolytes, for example sodium chloride or potassium chloride, or by evaporating the reaction solution, for example by spray drying, in which case a buffer substance can be added to the synthesis solution.

The disazo compounds of the formula (1) according to the invention—hereinafter called the compounds (1)—have fiber-reactive dye properties. They can therefore be used for dyeing (including printing) hydroxy-containing and/or carboxamido-containing fiber materials. Similarly, the as-synthesized solutions of the compounds (1) can be used directly as liquid dyes, with or without addition of a buffer substance and with or without concentrating.

The present invention therefore also provides for the use of the compounds (1) according to the invention for dyeing (including printing) hydroxy- and/or carboxamido-containing fiber materials, i.e. processes for dyeing such substrates using a compound (1) as dye. The materials are preferably used in the form of textile fibers, such as yarns, wound packages and fabrics.

Hydroxy-containing materials are those of natural or synthetic origin, for example cellulose fiber materials and their regenerated products or polyvinyl alcohols. Cellulose fiber materials are preferably cotton but also other vegetable fibers, such as linen, hemp, jute and ramie fibers; examples of regenerated cellulose fibers are staple viscose and filament viscose.

Examples of carboxamido-containing materials are synthetic and natural polyamides and polyurethanes in the form of fibers, for example wool and other animal hairs, silk, leather, nylon-6,6, nylon-6, nylon-11 and nylon-4.

The compounds (1) can be applied to and fixed on said substrates as per the use provided for by the invention using the techniques known for water-soluble dyes, in particular fiber-reactive dyes, for example by bringing a dissolved form of the compound (1) on to or into the substrate and fixing it thereon or therein by heating or the action of an alkaline agent, or both. These dyeing and fixing methods have been numerously described not only in the trade literature but also in the patent literature, for example in the documents cited at the beginning.

The compounds (1) produce not only on carboxamido-containing materials, in particular on wool, but also on hydroxy-containing material, in particular cellulose fiber material, brown, in particular reddish brown, dyeings and prints in a high color yield and good color buildup with minimal temperature and alkali dependence. Owing to their particular reddish brown shade, they can be used with particular advantage in trichromatic dyeing. The dyeings and prints obtainable with the compounds (1) of the invention have good fastness properties, such as good light and wet fastness properties, for example a good dry light fastness and good wet light fastness properties of the dyed material moistened with tap water or an acid or alkaline perspiration solution, good wash fastness properties at 60° to 95° C., even in the presence of perborates, acid and alkaline milling, cross-dyeing and perspiration fastness properties, good alkali, acid, water and seawater fastness properties and good chlorinated water and hypochlorite fastness properties, also good fastness to pleating, hot pressing and rubbing.

The dyeings and prints on carboxamido-containing material, in particular on wool, have particularly good light, wash and wet light fastness properties, even without the otherwise customary ammoniacal aftertreatment of the dyed material. Similarly, material composed of wool fibers of different provenances can be dyed level with the azo compounds of the invention, although a customary leveling aid, e.g. N-methyltaurine, may be added to improve the leveling power if desired.

The Examples which follow illustrate the invention. Parts and percentages are by weight, unless otherwise stated. Parts by weight bear the same relation to parts by volume as the kilogram to the liter.

The compounds described in the Examples by formula are shown in the form of the free acids; in general, they are prepared and isolated in the form of their alkali metal salts and used for dyeing in the form of their salts. Similarly, the starting compounds and components mentioned in the Examples which follow in the form of the free acid can be used in the synthesis as such or in the form of their salts, preferably alkali metal salts. The reported visible absorption maxima ($\lambda_{max}$ values) were determined on an aqueous solution of the alkali metal salts.

EXAMPLE 1

303 parts of 2-aminonaphthalene-4,8-disulfonic acid are diazotized in a conventional manner in 1000 parts of a sulfuric acid aqueous solution by addition of a 40% strength aqueous sodium nitrite solution. Then 223 parts of 1-aminonaphthalene-6-sulfonic acid are added and the coupling reaction is carried out at a pH between 4 and 5 and at a temperature of between 10° and 15° C. This batch is then brought with sulfuric acid to a pH below 2 and diazotized in the same way by means of sodium nitrite (following each diazotization reaction excess nitrous acid is destroyed in a conventional manner with amido-sulfuric acid), a solution of 108 parts of 3-methylaniline in 100 parts of 33% strength aqueous hydrochloric acid is added, the pH is adjusted with sodium carbonate to 3.5–4, the coupling reaction is carried out within that pH range at a temperature of about 20° C., the pH is then adjusted to 7, the batch is cooled down to 5° C., and 135 parts of cyanuric fluoride are gradually added while a pH between 6 and 7 and a temperature between 0° and 10° C. are maintained. Then 139 parts of anthranilic acid are added and the second condensation reaction is carried out at a temperature between 5° and 10° C. and at a pH between 6 and 7.5.

The resulting synthesis batch is clarified by means of 20 parts of kieselguhr and filtration. The novel disazo compound of the formula (written in the form of the free acid)

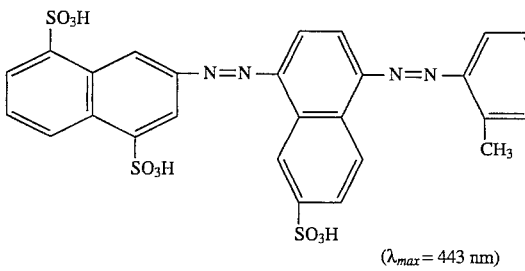
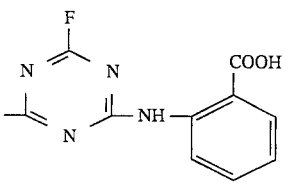

($\lambda_{max}$ = 443 nm)

is isolated in the form of an alkali metal salt (sodium salt) by evaporating or spray-drying the filtrate or by salting out with sodium chloride.

This disazo compound has very good dye properties and applied to and fixed on the materials mentioned in the description, in particular cellulose fiber materials, such as cotton, by the methods customary in the art for fiber-reactive dyes produces strong, reddish brown dyeings and prints having good fastness properties, in particular high light fastness and hypochlorite fastness.

EXAMPLE 2

To prepare a disazo compound according to the invention, first the procedure of Example i is followed to prepare the aminodisazo starting compound by coupling the diazo salt of 383 parts of 2-aminonaphthalene-4,6-8-trisulfonic acid with 223 parts of 1-aminonaphthalene-6-sulfonic acid and subsequent diazotization of the resulting aminomonoazo compound and coupling with 108 parts of 3-methylaniline. The reaction batch containing the aminodisazo compound is then admixed at a temperature of between 0° C. and 5° C., and at a pH of 7, maintained by means of sodium carbonate, with the reaction product of 135 parts of cyanuric fluoride, 139 parts of anthranilic acid, 84 parts of sodium fluoride and 100 parts of 33% strength aqueous hydrochloric acid. The batch is subsequently stirred for about 60 minutes at about 20° C. and at a pH maintained at 7 and then clarified with 20 parts of kieselguhr and filtration.

The resulting novel disazo compound of the formula (written in the form of the free acid)

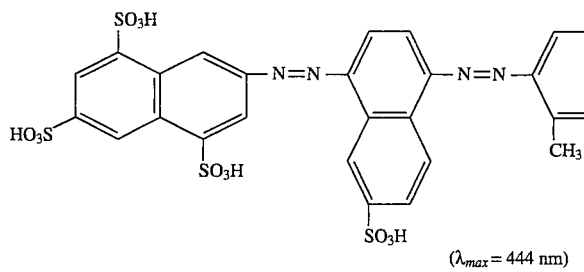

($\lambda_{max}$ = 444 nm)

can be isolated in a conventional manner in the form of an alkali metal salt (sodium salt) by salting out with sodium chloride or by spray-drying the filtrate.

The disazo compound of the invention has very good fiber-reactive dye properties and applied to and fixed on the materials mentioned in the description, in particular cellulose fiber materials, by the methods customary in the art produces strong, reddish brown dyeings and prints having good fastness properties, in particular good light fastness and hypochlorite fastness.

EXAMPLE 3

253 parts of aniline-2,5-disulfonic acid are diazotized in a conventional manner in 1000 parts of dilute sulfuric acid, then 223 parts of 1-aminonaphthalene-6-sulfonic acid are added and the coupling reaction is carried out at a pH of 4 to 5 and at a temperature of from 10° to 15° C. Thereafter the resulting aminoazo compound is indirectly diazotized and excess nitrite is destroyed with amidosulfuric acid. A solution of 108 parts of 3-methylaniline in 100 parts of 33% strength aqueous hydrochloric acid is added, the pH is brought with sodium carbonate to 3.5–4, and the coupling reaction is carried out at about 20° C. The batch is then admixed with the reaction product of 135 parts of cyanuric fluoride, 139 parts of anthranilic acid and 84 parts of sodium fluoride at 0° C. and a pH below 1; the batch is subsequently stirred at 20° C. for 1 hour while the pH is maintained.

The resulting solution of the novel disazo dye which, written in the form of the free acid, has the formula

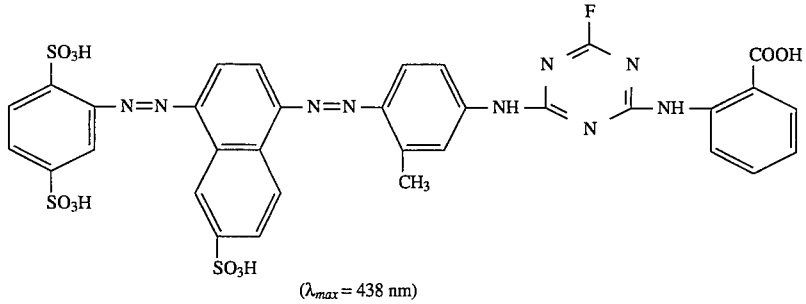

($\lambda_{max}$ = 438 nm)

is clarified by means of 20 parts of kieselguhr and filtration. The dye is isolated from the filtrate by salting out with sodium chloride or by spray-drying the filtrate. It has good dye properties, giving for example, strong, reddish brown dyeings and prints having good fastness properties.

What is claimed is:

1. A disazo compound of the formula (I)

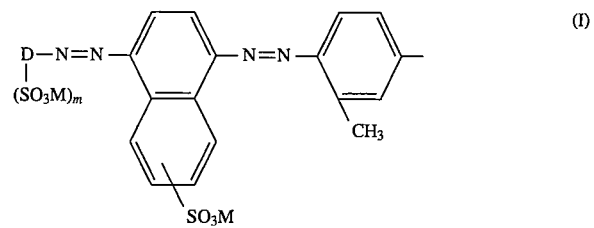

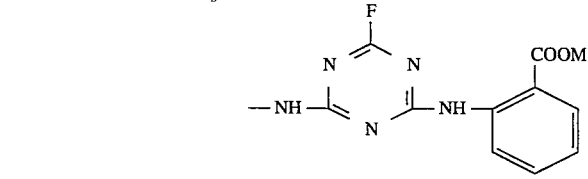

wherein:

D is naphthyl;

M is hydrogen or a salt-forming metal;

m is 1, 2, or 3; and the group —SO$_3$M on the 1,4-naphthalene is attached to this 1,4-naphthalene in position 6, 7 or 8.

2. A disazo compound as claimed in claim 1, wherein D is 2-naphthyl, and m is 2 or 3.

3. A disazo compound as claimed in claim 1, wherein m is 3.

4. A disazo compound as claimed in claim 1, wherein said salt-forming metal is an alkali metal.

* * * * *